No. 849,146. PATENTED APR. 2, 1907.
J. LEDWINKA.
AUTOMOBILE.
APPLICATION FILED JULY 10, 1906.
3 SHEETS—SHEET 2.
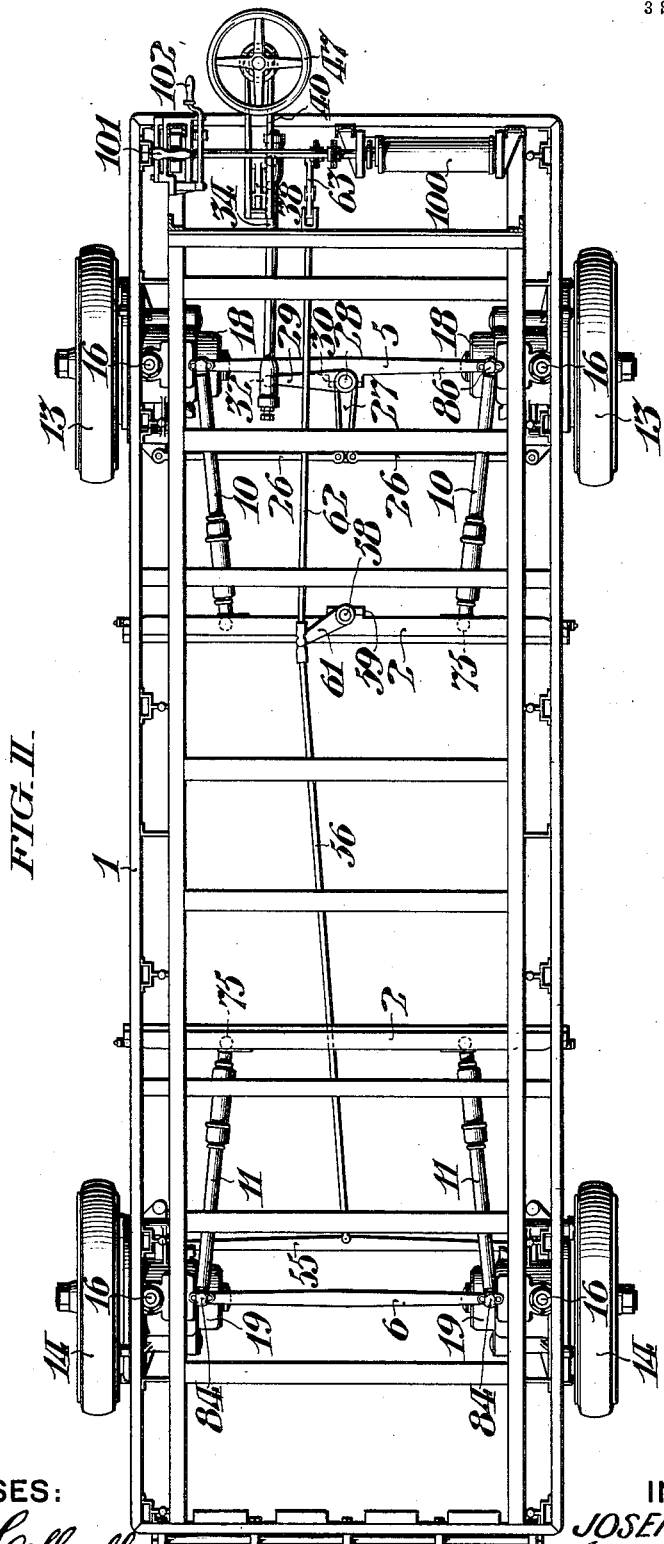
FIG. II.
WITNESSES:
INVENTOR:
JOSEPH LEDWINKA, No. 849,146. PATENTED APR. 2, 1907.
J. LEDWINKA.
AUTOMOBILE.
APPLICATION FILED JULY 10, 1906.
3 SHEETS—SHEET 3.
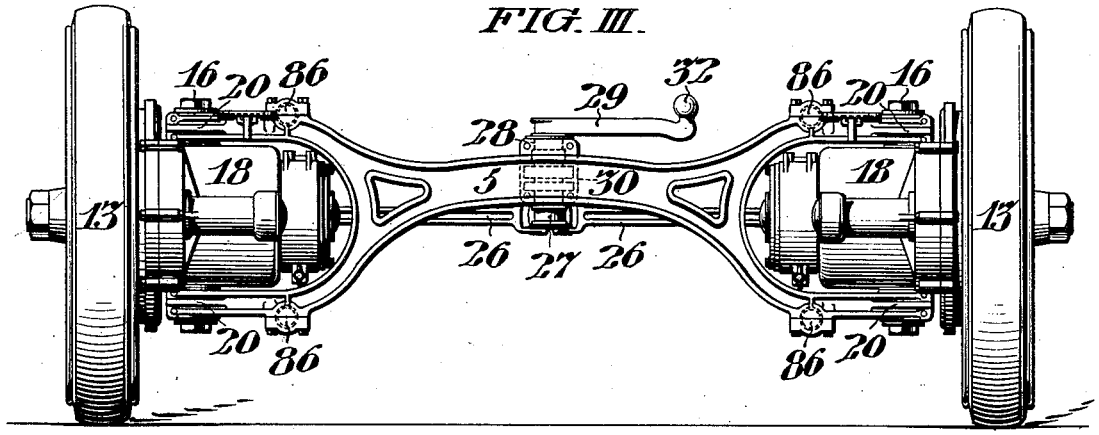
FIG. III.
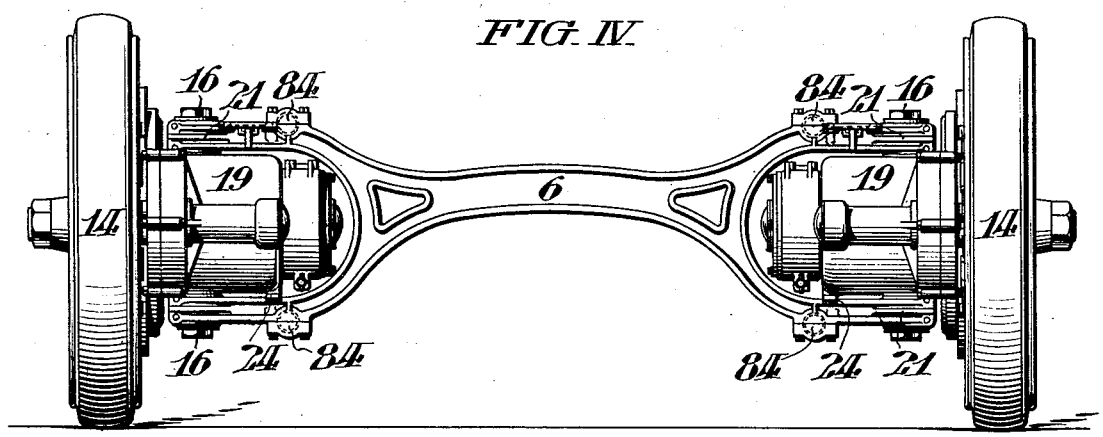
FIG. IV.
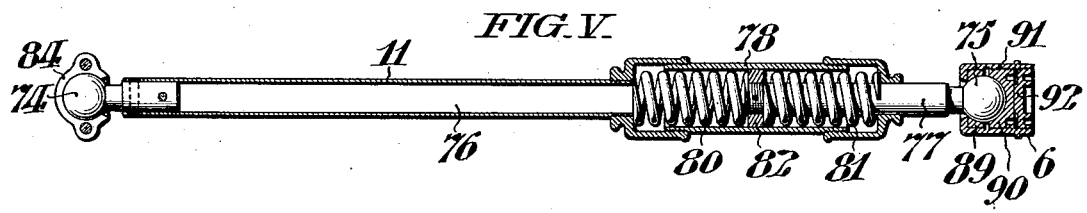
FIG. V.
WITNESSES:
Clifton C. Hallowell
John C. Bergner
INVENTOR:
JOSEPH LEDWINKA,
by Paige, Paul & Fraley
Attys.

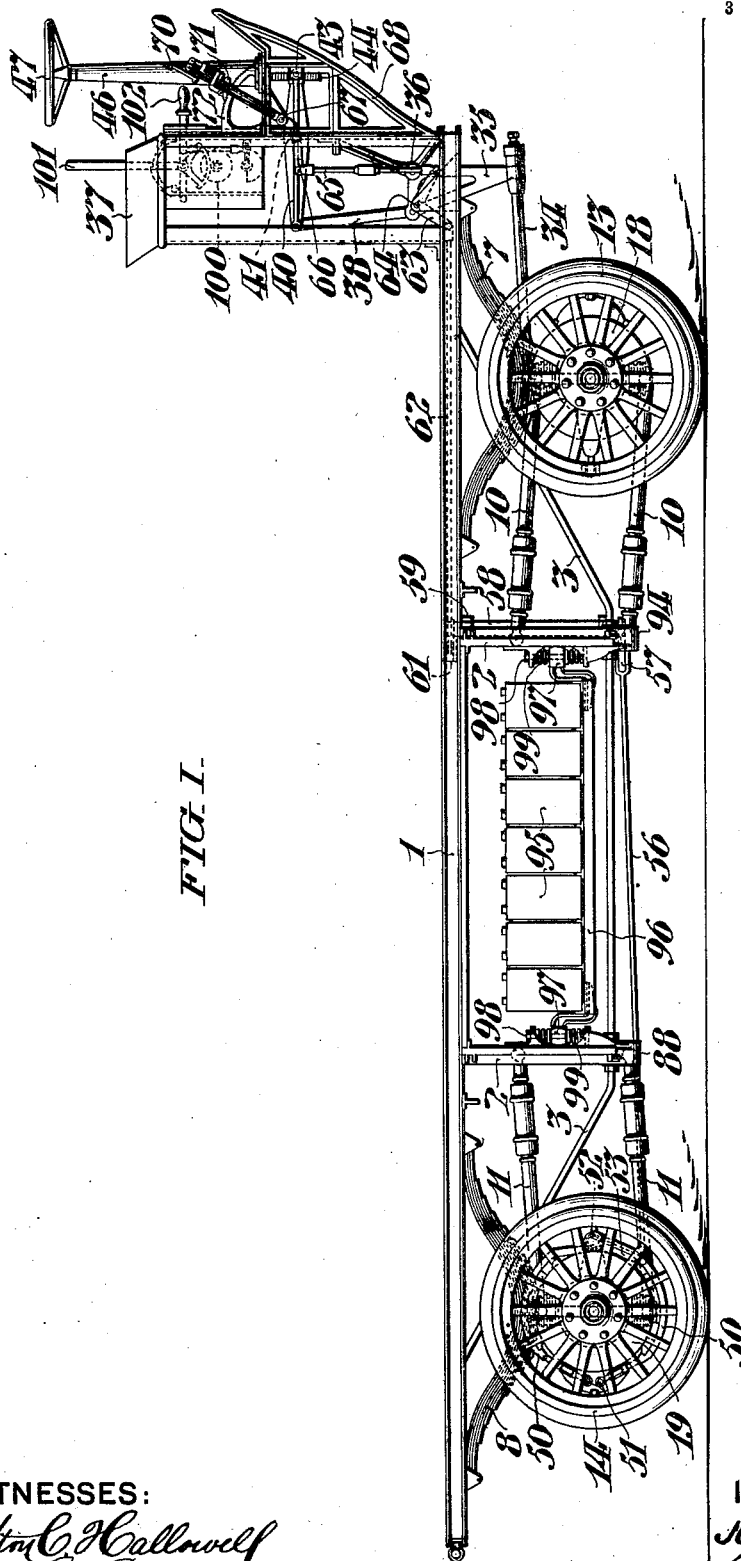

UNITED STATES PATENT OFFICE.

JOSEPH LEDWINKA, OF PHILADELPHIA, PENNSYLVANIA, ASSIGNOR TO THE IMPERIAL ELECTRIC MOTOR COMPANY, OF PHILADELPHIA, PENNSYLVANIA, A CORPORATION OF MAINE.

AUTOMOBILE.

No. 849,146.

Specification of Letters Patent.

Patented April 2, 1907.

Application filed July 10, 1906. Serial No. 325,458.

*To all whom it may concern:*

Be it known that I, JOSEPH LEDWINKA, of Philadelphia, in the county of Philadelphia and State of Pennsylvania, have invented a certain new and useful Improvement in Automobiles, whereof the following is a specification, reference being had to the accompanying drawings.

My improvement is particularly applicable to electrically-propelled automobiles of the type wherein the motors are respectively local to the vehicle-supporting wheels and arranged to turn with the latter on vertical axes in the vehicle-frame.

My improvement relates particularly to the underframes of such vehicles, and it is an object thereof to provide means tending to maintain the vehicle-supporting wheels in predetermined position with respect to the frame, but capable of yielding horizontally to a limited extent, sufficient to minimize the shock of encounter of said wheels with irregularities of the surface traversed by the vehicle. As hereinafter described, such means includes buffer-rods respectively local to the individual wheels, and each comprising members which are relatively movable in the direction of the length of the rod, and springs tending to maintain said relatively movable members in a predetermined relation but capable of yielding, so that the effective length of said rods is reduced or extended in correspondence with the stress upon the wheels with which they are connected.

My invention comprises the various novel features of construction and arrangement hereinafter more definitely specified, including axle-frames of peculiar construction adapted to coöperate with said rods.

In said drawings, Figure I is a side elevation of a vehicle conveniently embodying my improvements. Fig. II is a fragmentary plan view of the underframe of said vehicle, showing the arrangement of the buffer-rods and wheels. Fig. III is a front elevation of said underframe. Fig. IV is a rear elevation of said underframe. Fig. V is a longitudinal sectional view of one of the spring buffer-rods shown in Figs. I and II.

Referring to Figs. I and II, the body-frame comprises the rectangular platform 1, the vertical hanger-frames 2, and brace-rods 3, which are in rigid relation. The underframe comprises the front and rear axle-frames 5 and 6, connected with said body-frame 1 by the springs 7 and 8 and by the spring buffer-rods 10 and 11, which are arranged in pairs, respectively, local to the front wheels 13 and rear wheels 14. Said wheels 13 and 14 are respectively connected with said front and rear axle-frames 5 and 6 by vertical trunnions 16, which are in rigid relation with the respective motor-casings 18 and 19, supported in bearings 20 and 21 in their respective axle-frames. The casings 19 are rigidly secured to the axle-frame 6 by the bolted connections 24. However, the front wheels 13 are free to turn upon their trunnions 16 and are respectively connected by the links 26 with the arm 27 of the bell-crank lever comprising the vertical shaft 28 and arm 29, said shaft being mounted in the bearing 30 in said axle-frame 5. As shown in Fig. III, said lever-arm 29 is provided with the ball end 32, which is connected by the link 34 with the bell-crank lever 35, pivoted at 36 beneath the chauffeur's seat 37. Said lever 35 is connected by the link 38 with the lever 40, pivoted at 41 beneath said seat 37 and provided at its opposite end with the nut 43, engaged by the vertical screw-shaft 44, which is mounted in the standard 46 and provided with the steering-wheel 47. It is to be understood that the arrangement last described is such that said wheels 13 may be turned upon their vertical trunnions 16 in either direction in accordance with the direction of rotation of said wheel 47, the connections being such that when said wheel 47 is turned to the right or left the wheels 13 are turned to the right or left. Each of said wheels 14 is provided with a band-brake comprising two semi-annular members 50, pivoted at 51 upon the local motor-casing 19 and pivotally connected at their opposite ends upon eccentric-pins 52, carried by a lever 53. The two levers 53 of the pair of wheels 14 are transversely connected by the yoke 55, and the latter is connected by the link 56 with the lever-arm 57, whose shaft 58 is mounted in the bearing 59 on the front hanger-frame 2. Said shaft 58 is also provided with the lever-arm 61, which is connected by the link 62 with the bell-crank lever 63, pivoted at 64 on the frame 1. Said lever 63 is connected by the adjustable link 65 with the lever 66, pivoted at 67 in the frame 68, which supports the seat 37. The upper end of said lever 66 is provided with the pedal 70 in operative relation with the pawl 71, arranged to traverse the sectoral ratchet 72.

It is to be understood that the brake mechanism above described is so constructed and arranged that the brakes 50 may be applied with any desired degree of pressure by manipulation of the lever 66 to set it in adjusted position on said ratchet 72.

Fig. V is a plan sectional view taken longitudinally with respect to the lower one of the spring buffer-rods 11, (shown at the left-hand side of Fig. I,) and shows the construction which is common to all of the spring buffer-rods. Each rod is provided with ball ends 74 and 75, respectively, in rigid relation with the relatively movable members 76 and 77, the latter being arranged to reciprocate within the former and provided at its inner end with a case 78 for the springs 80 and 81. Said springs abut against said member 76 at their outer ends and hold between their inner ends the collar 82, which is in rigid relation with the rod member 77. It is to be understood that the arrangement last described is such that said springs 80 and 81, being normally compressed in opposition to each other, tend to maintain the spring buffer-rods of predetermined invariable length, but that said rods are lengthened or shortened automatically in correspondence with any abnormal stress upon them which compresses one of said springs and permits the other to expand.

As shown in Fig. IV, the axle-frame 6 is provided with four ball-socket bearings 84, which are fitted to the ball ends 74 of the spring buffer-rods 11. As shown in Fig. III, the axle-frame 5 is similarly provided with four ball-socket bearings 86, which are fitted to the corresponding ball ends of the spring buffer-rods 10.

The rear hanger-frame 2 is provided with four ball-socket bearings 88, fitted to the ball ends 75 of the spring buffer-rods 11. One of said bearings 88 is shown in horizontal section in Fig. V, comprising the opposed bearing-ring 89 and disk 90, fitted to the socket 91 in the frame 6. Said disk 90 is adjustable in screw-threaded engagement with said socket, and accidental displacement thereof is prevented by the disk 92, which is also in screw-threaded engagement with said socket. The front hanger-frame 2 is also provided with four ball-socket bearings 94, which are like the bearings 88 above described and fitted to the corresponding ball ends of the spring buffer-rods 10. It is to be understood that the arrangement of said buffer-rods 10 and 11 is such that although the axle-frames 5 and 6 are normally maintained in predetermined parallel relation whenever the wheels 13 and 14 encounter an obstruction they may yield horizontally to a limited extent, carrying with them the respective axle-frames, being, however, restored to their predetermined parallel relation by the springs 80 and 81 immediately upon release from the abnormal stress.

In the type of vehicle which I have chosen for illustration the motors in the casings 18 and 19 are electrical and arranged to be energized by the storage battery 95, conveniently supported between the hanger-frames 2 on the hanger 96, having bearings 97 at its opposite ends arranged to reciprocate on the bolts 98, but normally maintained in central position thereon by the springs 99. Said motors are arranged to be electrically connected with said battery by the controller 100, which is conveniently located beneath the chauffeur's seat 37 and provided with the operating-levers 101 and 102.

It is to be understood that I do not desire to limit myself to the employment of my improved frame in connection with an electrically-propelled vehicle, and it is obvious that various modifications may be made in the details of construction of the vehicle without departing from the essential features of my invention.

I claim—

1. In a vehicle, the combination with axle-frames provided with supporting-wheels; of a body-frame; springs independently connecting said axle-frame with said body-frame; spring buffer-rods connecting said axle-frame with said body-frame, each comprising relatively movable members; and, springs tending to maintain said rods of a predetermined length, substantially as set forth.

2. In a vehicle, the combination with a body-frame; of axle-frames provided with supporting-wheels; means resiliently connecting said body-frame and axle-frames, comprising spring buffer-rods, each comprising relatively reciprocatory members; and, means tending to maintain said members in predetermined relation, substantially as set forth.

3. In a vehicle, the combination with a horizontal body-frame, carrying vertical hanger-frames; of vertical axle-frames provided with supporting-wheels; and, a pair of spring buffer-rods local to each wheel, connecting its axle-frame with one of said hanger-frames, respectively above and below the wheel-axis, substantially as set forth.

4. In a vehicle, a spring buffer-rod provided with ball ends respectively in rigid relation with members of the rod which are mounted to reciprocate one within the other; a collar on the inner rod member; and, springs compressed in opposition on opposite sides of said collar, in engagement with abutments in the outer rod, substantially as set forth.

5. In a vehicle, the combination with a body-frame provided with ball-sockets; of an axle-frame provided with ball-sockets; rods provided with ball ends respectively engaged with said body-frame and said axle-frame; each of said rods comprising axially-alined relatively reciprocatory members; and, springs tending to maintain said rod members in predetermined relation, substantially as set forth.

In testimony whereof I have hereunto signed my name, at Philadelphia, Pennsylvania, this 5th day of July, 1906.

JOSEPH LEDWINKA.

Witnesses:
D. BRITTON CHAMBERS,
CHARLES BERG.